Figure 1:
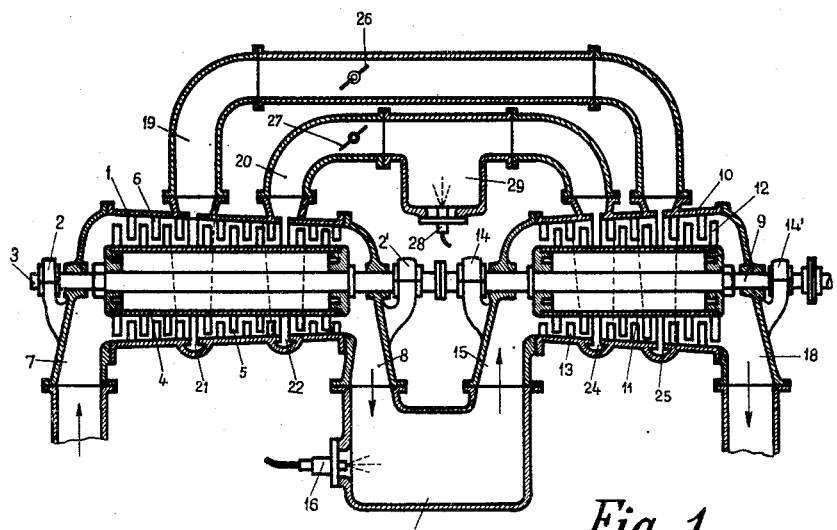

July 25, 1944.　　　G. JENDRASSIK　　　2,354,213

ROTARY ENGINE, MAINLY GAS TURBINE

Filed Nov. 29, 1940　　　2 Sheets-Sheet 1

July 25, 1944.  G. JENDRASSIK  2,354,213
ROTARY ENGINE, MAINLY GAS TURBINE
Filed Nov. 29, 1940   2 Sheets-Sheet 2

Witnesses:

Inventor:

Patented July 25, 1944

2,354,213

UNITED STATES PATENT OFFICE 2,354,213

ROTARY ENGINE, MAINLY GAS TURBINE

George Jendrassik, Budapest, Hungary; vested in the Alien Property Custodian

Application November 29, 1940, Serial No. 367,702
In Hungary November 25, 1939

1 Claim. (Cl. 60—41)

Turbines and compressors of the rotary blade type in which the working fluid suffers a change of volume of a certain magnitude are generally of such design as to ensure that it should be at certain definite figures of the change of volume, or, in other words at certain definite figures of the speed of flow varying in dependence on the change of volume that the turbines and rotary compressors operate correctly and at high efficiencies. Accordingly, conditions of operation in which (as e. g., at starting, or during operation at reduced speeds or at reduced load) the working fluid will not suffer the change of volume or change of speed corresponding to normal conditions, will cause the efficiency of the machines in question to become reduced. This circumstance may in certain cases, e. g., when a gas turbine set composed of a gas turbine and a compressor and designed for a fairly substantial compression pressure has to be set to work, lead to very troublesome consequences. In the case of such machines starting is performed in such a manner that the set is rotated by means of an external source of power until it reaches a speed at which it is already able to continue its acceleration by its own power. If, however, the efficiencies at which the compressor and the turbine operate during the process of starting are low, this will result, on the one hand, in a very substantial increase of the power requirements of the starting machine, and, on the other hand, in the fact that it will be only at a much higher speed that the condition in which the set is already able to continue its acceleration by its own power will be reached.

The process and apparatus according to the invention enables this drawback to be eliminated by an arrangement in which, when starting rotary compressors, turbines or sets of machinery composed of such machines, or operating them at part load (at part speed), a portion of suitable magnitude of the working fluid is passed through bleeding and/or by-pass lines in such a manner as to ensure that the weight of working fluid flowing per unit of time through the high-pressure stages of the turbine should be lower than the weight of working fluid flowing per unit of time through the low-pressure stages, and that owing to the corresponding variation of the throughflow speeds, the actual flow speeds resulting in the various pressure stages should be shifted, as closely as possible, towards those figures of speed characteristic for the design of the machine or set of machinery of the said type, as will enable the most advantageous efficiency to be obtained.

Figure 2:
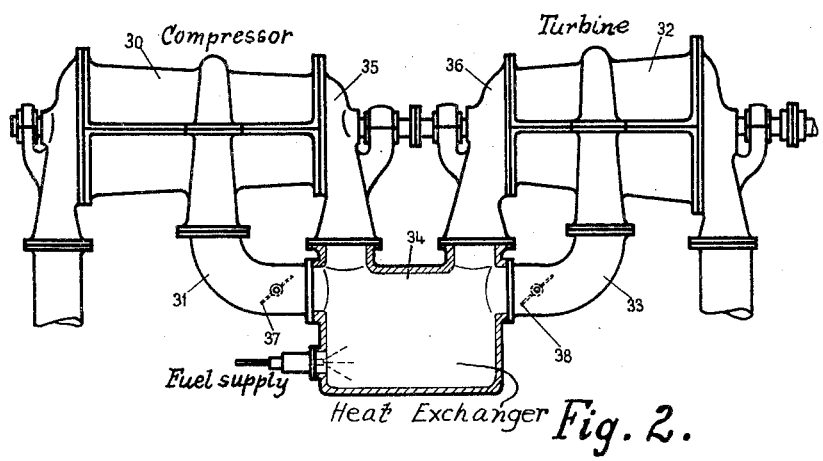
Figure 3:
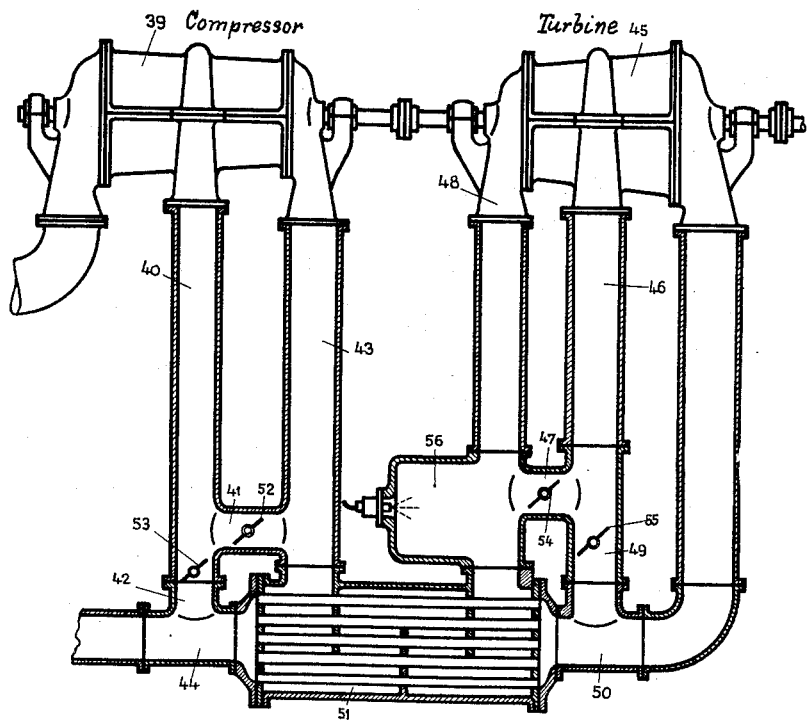

An embodiment exemplifying the apparatus suitable for carrying the process into effect is shown in longitudinal section in Fig. 1. In Fig. 2 another embodiment, shown by way of example, is shown in front elevation, whilst Fig. 3 is an elevation, and partly a longitudinal section, of a further variant of construction, equipped with a heat exchanger.

According to Fig. 1, the compressor rotor 4, rotatable by means of the shaft 3 journalled in the bearings 2, 2', is arranged in the compressor casing 1. The rotating blade rings 5 mounted into the rotor 4 are arranged between the stationary blade rings 6. To the compressor casing there join on, at the ends of the rotor, on the one hand the inlet branch 7 and on the other hand the outlet branch 8. To the shaft 3 of the compressor there is coupled the shaft 9 of the turbine, carrying the turbine rotor 11 arranged in the turbine casing 10. The turbine rotor is equipped with the rotary blading 12, whereas the stationary blades 13 are mounted into the turbine casing 10. The turbine shaft 9 is journalled in the bearings 14, 14'. The inlet branch 15 of the turbine communicates with the outlet branch 8 of the compressor through the combustion space 17 fed by the burner 16. At that end of the turbine rotor which is opposite to the inlet the discharge branch 18 of the turbine joins on to the turbine casing. Joining on to the working space of the compressor the bleeding or by-pass lines 19 and 20 are arranged, which, through the apertures 21 and 22, respectively, are communicating with the working space of the compressor; these by-pass lines are, through the apertures 24 and 25, respectively, communicating also with the working space of the turbine. The pipe-lines are equipped with the closing or throttling members 26 and 27 suitable for closing or only throttling their cross-section. The by-pass line 20 moreover also communicates with the auxiliary combustion space 29 fed by the burner 28.

The method of operation of this equipment is the following: If the rotors rotate, the compressor draws-in working fluid (air) through the inlet branch 7, compresses it and drives it through the outlet branch 8 into the combustion space 17, in which the air becomes heated owing to the combustion of the fuel introduced by means of the burner 16. From here the working fluid passes into the working space of the turbine, in which it expands down to a certain lower figure of pressure, following which it leaves the turbine through the discharge branch 18. The work produced by the apparatus can be taken off either from the shaft 3 or from the shaft 9. If the closing members 26 and 27 close the by-pass lines 19 and 20 no flow whatever takes place in these lines; generally this will be the condition of operation corresponding to normal load.

In case the apparatus is operated at a speed substantially lower than the normal speed, or at reduced load, this will—in view of the fact that the pressure which can be produced in the rotary compressor will become reduced in a very substantial extent with the diminution of the speed—result in throughflow speeds differing from the figures of speed corresponding to normal operating conditions of good efficiency being set up in the compressor; notably—in view of the fact that compression is now taking place in a less degree only—the speeds in the high-pressure section of the compressor will generally be too high, and those in the low-pressure section of the compressor will be too low as compared to the figures at which it would at the given reduced speed be possible for the compressor to operate at a high efficiency.

A similar phenomenon will present itself in the turbine also, because at a reduced speed the pressure drop set up in the turbine will also be lower than the figure corresponding to normal operation. This will result in too high speeds being set up in general in the high-pressure section, and too low speeds in the low pressure section of the turbine also, in consequence whereof the efficiency of the turbine will become lowered. If in such case the closing members 26 and 27 arranged in the by-pass lines 19, 20 are opened, a certain amount of working fluid will flow through these. This throughflow will cause the disadvantageous distribution of speeds mentioned in what precedes to be altered in the favourable sense; notably, in the high-pressure stages the speed of flow will become diminished because a portion of the working fluid will be led through the bleeding or by-pass line in such a manner that this portion will not flow through the high-pressure stages at all. In the case of this embodiment described by way of example two by-pass lines not connected with each other are shown. The purpose of this arrangement is to make the distribution of speeds in the rotating machines approximate the ideal distribution as closely as possible. It is of course possible to employ a greater number of independent bleeding lines or bleeding points; it is, however, also possible to bleed the compressor in one place only, or to cause the working fluid extracted through the bleeding point to be admitted to the turbine at one point only.

In view of the fact that when the bleeding lines are operating, only a portion of the working fluid will pass through the combustion space 17, the case may arise that it will not be possible, without overheating the working fluid, to introduce in the said space such a quantity of heat as would be sufficient for starting the apparatus, or for maintaining the prescribed conditions of operation. This drawback is obviated by the auxiliary combustion space 29, the burner 28 of which is suitable for the introduction of an additional quantity of heat, so that with its aid a part of the working fluid subjected to bleeding also can be heated again.

If the bleeding point of the compressor, as well the point where the by-pass line joins on to the turbine are chosen so as to ensure that the pressures ruling at these points under normal conditions of service should be equal, the closing member provided in the by-pass line may be kept open under normal conditions of operation also without any flow being set up in the said by-pass line. In this case the flow in the by-pass line will start automatically in the desired direction at reduced speed or at part load, when the quantity of heat introduced is lower than the quantity corresponding to the normal figure of load, and accordingly, closing members or any control of such members are indeed not required in this case.

In the case of the arrangement shown on Fig. 2 the bleeding line 31 of the compressor 30 is not continued directly in the by-pass line 33 of the turbine 32; instead hereof, the bleeding line 31 as well as the by-pass line 33 are joining on to the combustion chamber 34. It is into this same space that the outlet branch 35 of the compressor 30 as well as the inlet branch 36 of the turbine 32 also open. Into the lines 31 and 33 the control members 37 and 38, respectively, suitable also for the complete closing of the cross-section of the lines, are mounted. During normal service, this apparatus generally operates in such a manner that the members 37 and 38 are closed, whereas when starting the apparatus or operating it at reduced speed or possibly operating it at part load the closing members 37 and 38 are partly opened, thereby guiding corresponding portions of the working fluid in such a manner as to cause these portions to by-pass the high-pressure stages of the compressor, and of the turbine, respectively.

In the arrangement shown in Fig. 3 the bleeding line 40 of the compressor 39 branches out into two branches so as to form the lines 41 and 42. The line 41 joins on to the delivery duct 43 of the compressor, whereas the line 42 opens into the line 44, the pressure of which is lower than that of the said delivery duct; in the example shown, the line 44 constitutes at the same time the discharge line of the turbine. The by-pass line 46 joining-on to intermediate stages of the turbine 45 also possesses two branches, viz. the branches 47, 49; of these, the branch 47 joins on to the combustion chamber 56 which latter communicates also with the inlet branch 48 of the turbine, whereas the branch 49 communicates with the low-pressure line 50 constituting a continuation of the discharge branch of the turbine. In the case of this arrangement a heat exchanger 51, per se known, is inserted between the delivery duct 43 of the compressor and the inlet branch 48 of the turbine; this heat exchanger serves for causing fresh working fluid compressed by the compressor to be heated by means of fluid leaving the turbine. The control members 52, 53, 54 and 55, suitable for complete closing also, serve for the throttling and/or closing of the lines 41, 42, 47 and 49, respectively.

This apparatus operates in such a manner that in normal service the control members are generally closed, in consequence whereof there is, under these conditions, no flow of working fluid either through the bleeding line 40 or through the by-pass line 46. When starting the apparatus, or operating it at reduced speed, the control members 52 and 54 are preferably opened, thereby ensuring that the apparatus should function according to the method of functioning of the apparatus shown on Fig. 2, so that a part of the working fluid by-passes the high-pressure stages of the compressor and of the turbine. If it is desired to operate the apparatus at full speed, but on part load, it will be advisable to close the control member 52 and open the control member 53; in this case, a part of the working fluid will flow directly, through the line 42, into the line 44, without having flown through the high-pressure section of the turbine. If at the same time the control member 54 is closed and the control member 55 is opened, this will result in an amount of pressure being set up at the point where the by-pass line 46 joins the turbine, which will be slightly smaller, in an extent corresponding to the resistances to flow of the pipe lengths 46, 49 and 50 connected in parallel, than the amount of pressure set up in the discharge branch of the turbine, in view of the fact that the pressures at the junction point of the parallel branches in front of the heat exchanger should be exactly of the same magnitude. According to the invention the pipe-branch 46, 49 should be of smaller resistance, so that in this case the pressure at the point where the by-pass line 46 joins the turbine will fall below the pressure at the discharge port of the turbine. Consequently, the last part, situated between the by-pass line and the discharge branch, of the turbine will act as a compressor, compressing the working fluid in an extent corresponding to this slight difference of pressures, and a part of the working fluid will, after passing the turbine, flow back from the discharge line 50 through the by-pass lines 49 and 46 into the intermediate stages of the turbine. This will ensure that a smaller weight of working fluid will flow per unit of time through the high-pressure stages of the turbine, than through its low-pressure stages, and the mutual proportion of the various speeds set up in these stages will also become altered in a suitable extent, which circumstance will enable the efficiency of the turbine in the case of part loads to be improved.

The process according to the invention can be employed with advantage in all those cases in which for any reason the change of volume in the rotating machines, or the increase of volume in the turbine, becomes altered as compared to the normal figures. It is a matter of course that it is not only in the variants corresponding to the embodiments described by way of example but also in variants arranged differently therefrom that the invention can be applied, as well as in those cases in which the compressor or the turbine are, instead of the axial throughflow shown by way of example, operating according to some other system differing therefrom. Similarly the members employed for the introduction and combustion of the fuel as well as the heat exchanger, etc., may also be of any desired system.

I claim:

In a set of machinery, a multi-stage gas turbine performing useful work, a multi-stage compressor of the rotary blade type delivering the working fluid for and being driven by the said turbine, a direct connection between the discharge port of the compressor and the inlet port of the turbine including a combustion chamber for introducing heat into the compressed working fluid before its entering the turbine, a by-pass duct connecting intermediate bleeding and admission apertures on the casings of the compressor and turbine, respectively, and communicating with the said combustion chamber, a duct branched out from the by-pass duct part between the compressor and the combustion chamber so as to communicate with the atmosphere, another duct branched out from the by-pass duct part between the combustion chamber and the turbine so as to communicate with the discharge duct of the turbine, and closing members, suitable also for completely closing the controlled cross-sections, provided in the said branch ducts as well as in the by-pass duct parts between the combustion chamber and their branching points, the said bleeding and admission apertures being selected at such intermediate stages of practically equal pressures of the compressor and turbine as to enable the figures of flow speeds, set up at starting and when operating on part load in the various stages of these engines and deviating from the desirable figures of speed ensuring high efficiency with the given design in the case of normal operation, to be shifted towards the said desirable speed figures.

GEORGE JENDRASSIK.